Nov. 8, 1932.   P. L. TENNEY ET AL   1,886,849
SHIFTER LEVER MOUNTING
Filed Nov. 2, 1931
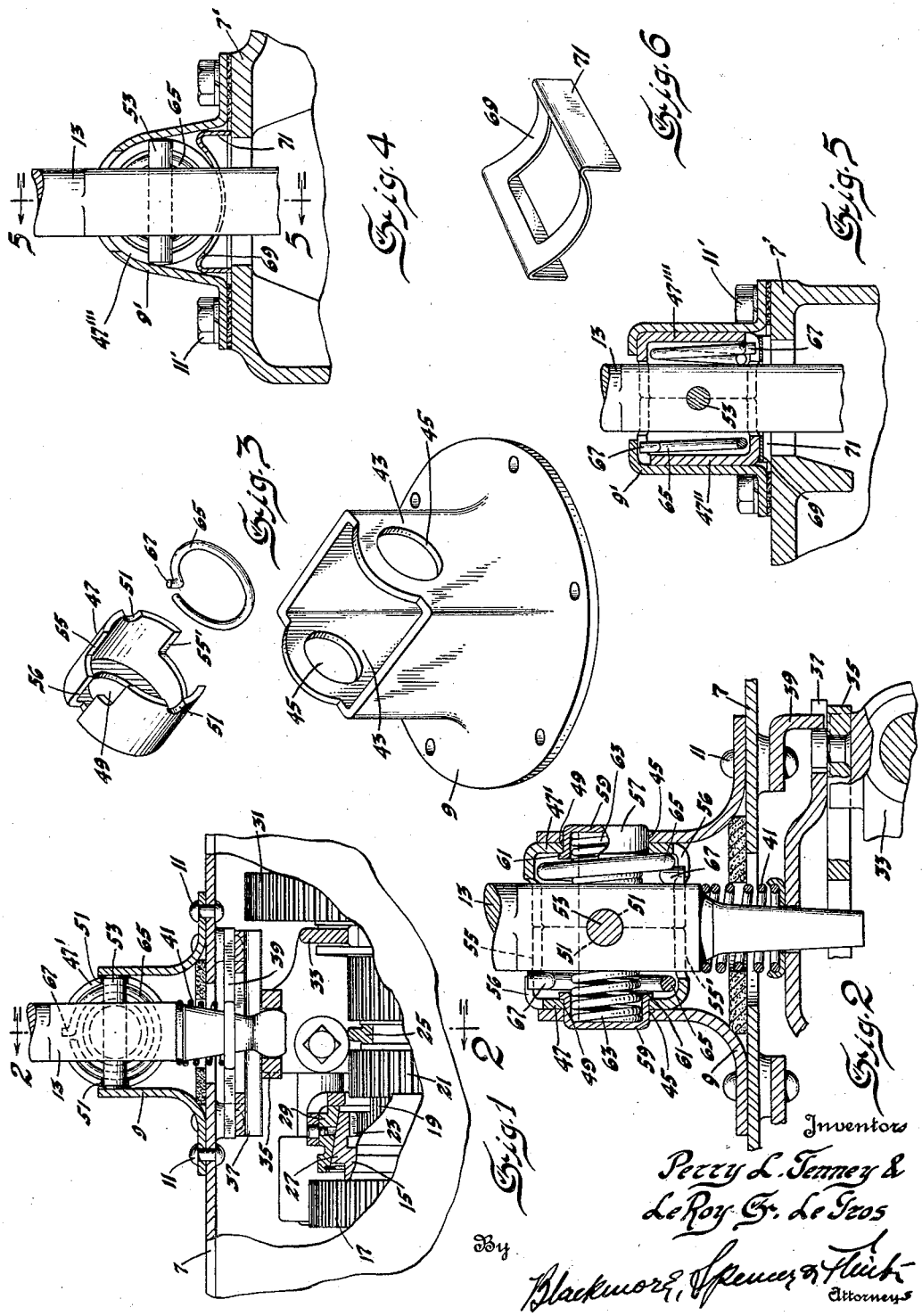

Patented Nov. 8, 1932

1,886,849

UNITED STATES PATENT OFFICE

PERRY L. TENNEY AND LE ROY F. LE GROS, OF MUNCIE, INDIANA, ASSIGNORS TO GENERAL MOTORS CORPORATION, OF DETROIT, MICHIGAN, A CORPORATION OF DELAWARE

SHIFTER LEVER MOUNTING

Application filed November 2, 1931. Serial No. 572,600.

This invention relates to lever mounting and has been designed more particularly as an improvement in the pivotal mounting for the shift lever of the change speed mechanism of a motor vehicle.

An object of the invention is to simplify and increase the precision of such a lever mounting.

Another object is to provide a construction which will prevent rotation of the shift lever about its longitudinal axis.

Still another object is to provide means to take up wear of the parts and prevent rattling.

An additional object is to provide means operative to bias the shift lever to a position in which it engages that part of the shift mechanism operable to effect high speed and second speed driving.

In one embodiment of the invention still another object is attained. In this form the structure has the added object of permitting the quick assembly and disassembly of the lever from the housing in which it is pivoted.

Other objects and advantages will appear from the following description.

In the drawing accompanying this description—

Fig. 1 is a view in side elevation partly broken away and in section.

Fig. 2 is a section on line 2—2 of Fig. 1.

Fig. 3 is a perspective in disassembled relation.

Fig. 4 is a view in longitudinal section of a modified form.

Fig. 5 is a section on line 5—5 of Fig. 4.

Fig. 6 is a perspective of a detail.

Referring by reference characters to the drawing, numeral 7 represents the gear housing carrying the change speed mechanism of a motor vehicle. It has a dome-shaped upper extension 9 for the passage and pivotal support of the shift lever 13, the extension being secured by fastening means 11.

The specific change speed mechanism is not a part of this invention and will be only briefly referred to in order to fully illustrate the relation in which the invention is applied. At 15 is a clutch driven shaft. It carries a gear 17 as usual, this being the gear which is in constant mesh with a driven gear on the parallel countershaft, not shown. At 19 is illustrated the splined shaft which, when itself driven by a clutch or gear connection with the driving shaft, effects the rotation of the propeller shaft. Numeral 21 shows a clutch member. It is slidable on the splined shaft. Its front end is to engage teeth 23 on the end of shaft 15 for driving at high speed. Its rear end is not illustrated but is provided with similar teeth to clutch teeth on a second speed driven gear rotatable on the splined shaft. A fork 25 is shown, the movements of which are to be made by the shift lever, such movements producing a sliding movement of clutch 21 for the purpose stated. Prior to the engagement of the clutch teeth frictional synchronizing clutch elements 27 and 29, one rigid with the driving shaft and the other on a movable member advanced by the movement of clutch 21, engage to prevent clash. At 31 is a slidable gear movable upon the clutch member 21 by the actuation of a fork 33 to engage suitable gears on the countershaft and reverse idler for driving at low speed and in reverse.

Numeral 35 is used to represent a transversely positioned lever which may be supported at its ends by the forks 25 and 33. The lever 35 is engaged at a mid length position to be rotated about the one or the other of its ends to move the fork associated with the unanchored end. Fixed to the housing is a guide member 39 which restrains an interlocking plate 37 from movements other than transversely of the housing. This plate 37, by engagement with the lever 13, is moved with the lever in its transverse movements, and when so moved is designed to engage and therefore lock from longitudinal movement the one or the other of the ends of lever 35. Preferably an anti-rattling spring 41 is used as shown in the drawing, one end being in abutment with a part of lever 13 and the other end engaging a part such as 37 of the shift mechanism.

As explained above, this description is given merely to briefly describe the change speed mechanism with which the lever 13 is used. It is to be understood that the lever 13 must be pivoted to provide movements at right angles to each other, one such movement being to effect the locking of one end of the lever 35, and the other to effect swinging of lever 35 about its anchored end.

The dome member 9 is shaped as shown in Fig. 3 with oppositely located flat faces 43. In this preferred form these faces are apertured as at 45. Within the dome 9 are two cups 47, 47'. These cups, in the preferred form, are coaxially positioned and provided with openings 49 in their otherwise closed ends, the openings registering with apertures 45 of the housing dome. The open ends of the cups are located adjacent each other and have their edges provided with diametrically opposite semi-circular grooves 51. These grooves cooperate (see Fig. 2) to form circular openings for the support of a pin 53 carried by the lever 13. To permit the lever to swing about the axis of pin 53 the edges of the cup are also cut away to form larger recesses as at 55 and 55'. It will be seen, therefore, that the lever may swing about the axis of pin 53 in its transverse movement by which the one or the other of the ends of lever 35 is locked, this movement being preparatory to the longitudinal swinging of the lever to effect clutch or gear engagement for driving. The latter movement is effected by the rotation of the pin 53 together with the cups 47, 47' about an axis concentric with openings 45. The cups must obviously be accurately positioned to maintain that axis. To that end there are secondary cups 57 having closed ends 59 and flanges 61 on their open ends. These cups fit within the registering openings 45 and 49. The flanges 61 engage the inner walls of the larger cups. Springs 63 engage the bottoms of the cups 57 and also at their opposite ends engage flat faces on lever 13. By this means the axis of rotation of cups 47, 47' is precisely fixed, and rattling is prevented. Moreover by pressing cups 57 inwardly against the resistance of spring 63 to such an extent that the bottoms of the cups are within the wall of the dome the lever assembly may be removed.

As a further aid to prevent rattling and to normally hold the lever in a position preparatory to being moved longitudinally at high speed or second speed driving there may be used additional springs, one of which is illustrated in Fig. 3 and designated as 65. These springs lie adjacent the flat faces of the lever and are concentric with springs 63. They have terminal locking tabs 67 at one end which engage in inner extensions 56 of the recesses 55, of the cups 47, 47'. The two springs are so shaped and positioned that normally one engages the lever above its pivot pin 53 and the other engages the lever below its pivot pin. As a result the springs cooperate in tending to swing the lever to a position from which when moved longitudinally it effects a driving ratio at high speed or second speed.

In Figs. 4, 5, and 6 is shown a modified form of the invention embodying the use of cups resembling cups 47, 47' of the form already described but in which the feature of ready removability is not incorporated and in which other means is provided to maintain the parts in correct position, take up wear, and prevent rattling.

In these figures the dome 9' is secured to the casing or housing 7' by fastening means 11'. The dome is not apertured as was dome 9 at 45 and the cups 47'' and 47''' resemble cups 47, 47', but are not apertured as were the cups shown in Fig. 3. The cups are, however, in other respects, like the cups 47, 47'. Springs 65 are in all respects like the springs 65 of Figs. 1 to 3 and are similarly anchored and operate to press the cups against the housing walls, to take up wear, and to bias the lever to its high speed and second speed transverse position. Cooperating with the springs 65 is a spring 69 which is shown in detail in Fig. 6. It is made from flat stock, bent between its ends to engage the walls of the cups and thus to form a lower seat for the cups. Its ends are turned down to engage and be supported by the wall of the housing beneath the cover as at 71. The spring 69 serves to take up vertical wear and prevents rattling. Springs 65 compensate for wear and bearing freedom and additionally bias the cups as explained above.

In each of the two forms the engagement of the pin and the cups prevent any rotation of the lever on its longitudinal axis.

It will be understood that while in the form of invention shown by Figs. 1 to 3 the biasing springs are shown, these springs may be omitted if desired.

We claim:

1. In combination, a housing, a lever, opposed cups, said cups being positioned in coaxial relation, the bottoms of said cups being remote from each other and in contact with the walls of said housing, and means to rotatably mount said lever relative to said cups, said lever and cups being rotatable together relative to said housing in a direction at right angles to the rotation of the lever relative to the cups.

2. The invention defined by claim 1 together with means to prevent displacement of the axes of said cups.

3. The invention defined by claim 1 together with a plurality of secondary cups, said housing and first cups having coaxial openings, each of said secondary cups projecting through adjacent openings in the first cup and housing and having peripheral flanges engaging the inner wall of the first cup around the opening therein together with yielding means to maintain said secondary cups in assembled relation.

4. The invention defined by claim 1 together with a flat yielding member supported on said housing and engaging the arcuate surfaces of said cups to prevent displacement of said cups and to take up wear.

5. In combination, a lever, a housing, means to pivot said lever in said housing comprising coaxial cups, said cups having open ends in adjacent relation, a pin carried by said lever, said adjacent edges of said cups having mating grooves to provide openings for the pivotal mounting of said lever about the axis of said pin, the closed ends of said cups being in contact with the wall of said housing for rotation about their common axis by movement of the lever at right angles to the first-mentioned movement.

6. The invention defined by claim 5, said edges of said cups having other openings to receive said lever as it rotates about the axis of said pin.

7. The invention defined by claim 5 together with springs within said cups and operable upon said lever to hold said cups in frictional engagement with said housing walls, to take up wear and prevent rattling.

8. The invention defined by claim 5 together with springs within said cups and operable upon said lever to hold said cups in frictional engagement with said housing walls to take up wear and prevent rattling, said springs shaped to normally hold said lever at one side of its mid transverse position.

9. The invention defined by claim 5, the housing and cups having registering apertures, secondary cups extending one through each set of apertures, said secondary cups having flanges to engage the inner walls of the first cups, and springs in the second cups engaging the bottoms thereof and said lever.

10. The invention defined by claim 5, the housing and cups having registering apertures, secondary cups extending one through each set of apertures, said secondary cups having flanges to engage the inner walls of the first cups, and springs in the second cups engaging the bottoms thereof and said lever together with springs between the lever and the first-named cups to bias said lever to a position at one side of its mid transverse position.

11. In combination, a housing, a lever for pivotal connection therewith, said housing having coaxial apertures, diametrically opposite trunnions assembled upon said lever, yielding means to normally project said trunnions through said apertures, said trunnions comprising opposed cups, said lever being pivoted to the edges of adjacent openings of said cups, secondary cups slidable in openings therefor in the bottoms of the cups and in the apertures of the housing, said yielding means comprising springs in the secondary cups engaging the bottoms thereof and also engaging said lever.

12. In combination, a housing, a lever for pivotal connection therewith, said housing having coaxial apertures, diametrically opposite trunnions assembled upon said lever, said trunnions constructed to permit rotation of said lever relative thereto in one direction of lever rotation but to rotate with the lever in a second direction of rotation thereof, and yielding means upon opposite sides of said lever and operable to project said trunnions through said openings.

In testimony whereof we affix our signatures.

PERRY L. TENNEY.
LE ROY F. LE GROS.